(12) United States Patent
Sager et al.

(10) Patent No.: US 10,655,570 B1
(45) Date of Patent: May 19, 2020

(54) GASOLINE VAPOR EXTRACTION AND STORAGE WITHIN A VEHICLE FUEL TANK SYSTEM

(71) Applicants: Roger C Sager, Munith, MI (US); Nithin Baradwaj, Ann Arbor, MI (US); Joseph M, Jackson, MI (US); Matthew M Delleree, Brighton, MI (US); Gregg T Black, Livonia, MI (US); Jennifer Bartaszewicz, Northville, MI (US); James J Daley, Jackson, MI (US); David R Pedro, Tecumseh (CA); Ruoming Gu, South Lyon, MI (US); Edward E Baker, Livonia, MI (US)

(72) Inventors: Roger C Sager, Munith, MI (US); Nithin Baradwaj, Ann Arbor, MI (US); Joseph M, Jackson, MI (US); Matthew M Delleree, Brighton, MI (US); Gregg T Black, Livonia, MI (US); Jennifer Bartaszewicz, Northville, MI (US); James J Daley, Jackson, MI (US); David R Pedro, Tecumseh (CA); Ruoming Gu, South Lyon, MI (US); Edward E Baker, Livonia, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/225,843

(22) Filed: Dec. 19, 2018

(51) Int. Cl.
*F02M 25/08* (2006.01)

(52) U.S. Cl.
CPC .... *F02M 25/0872* (2013.01); *F02M 25/0836* (2013.01)

(58) Field of Classification Search
CPC .................. F02M 25/0872; F02M 25/0836
See application file for complete search history.

(56) References Cited

U.S. PATENT DOCUMENTS

| | | | |
|---|---|---|---|
| 5,111,795 A | 5/1992 | Thompson | |
| 6,230,693 B1 | 5/2001 | Meiller et al. | |
| 7,293,552 B2 | 11/2007 | Leone et al. | |
| 2006/0065253 A1* | 3/2006 | Reddy | F01N 5/02 123/520 |
| 2010/0275888 A1* | 11/2010 | Yuen | F02M 25/0836 123/520 |
| 2011/0240896 A1* | 10/2011 | Young | F02M 25/0836 251/129.15 |
| 2012/0152210 A1* | 6/2012 | Reddy | F02M 25/0836 123/520 |

(Continued)

*Primary Examiner* — Joseph J Dallo
(74) *Attorney, Agent, or Firm* — Ralph E. Smith

(57) ABSTRACT

An evaporative emissions (EVAP) system and its method of control comprise commanding a three-way valve to fluidly connect an auxiliary vapor canister and a bottom portion of a fuel tank, controlling at least one of an engine of the vehicle and a purge pump of the EVAP system disposed between the engine, a separate primary vapor canister, and the auxiliary vapor canister to draws fuel vapor from the fuel tank into the auxiliary vapor canister for storage, commanding the three-way valve to fluidly connect the bottom portion of the fuel tank to an atmosphere outside of the EVAP system to generate additional fuel vapor in the fuel tank, commanding the three-way valve to fluidly connect the auxiliary vapor canister to the atmosphere, and controlling at least one of the engine and the purge pump to draw the fuel vapor from the auxiliary vapor canister into the engine.

20 Claims, 7 Drawing Sheets

(56) References Cited

U.S. PATENT DOCUMENTS

| | | | |
|---|---|---|---|
| 2014/0224225 A1* | 8/2014 | Kragh | F02M 25/0836 123/520 |
| 2015/0159597 A1* | 6/2015 | Woods | F02M 25/089 123/495 |
| 2016/0061153 A1* | 3/2016 | Jeffrey | F02M 25/0809 123/520 |
| 2016/0123254 A1* | 5/2016 | Burleigh | F02D 41/004 123/520 |
| 2016/0131055 A1* | 5/2016 | Jeffrey | F02D 41/0042 123/478 |
| 2017/0082038 A1* | 3/2017 | Dudar | F02M 25/0836 |
| 2017/0204796 A1* | 7/2017 | Dudar | F02D 41/221 |
| 2017/0342917 A1* | 11/2017 | Dekar | F02M 25/0836 |
| 2017/0342918 A1* | 11/2017 | Sager | F02D 41/004 |
| 2017/0342919 A1* | 11/2017 | Dekar | F02D 41/0045 |
| 2017/0342946 A1* | 11/2017 | Sager | F02M 25/0827 |
| 2017/0363055 A1* | 12/2017 | Dudar | F02D 41/22 |
| 2018/0142631 A1* | 5/2018 | Sager | F02D 41/0275 |
| 2018/0142634 A1* | 5/2018 | Sager | F02D 41/0032 |
| 2018/0195467 A1* | 7/2018 | Dudar | F02M 25/0809 |

\* cited by examiner

GASOLINE VAPOR EXTRACTION AND STORAGE WITHIN A VEHICLE FUEL TANK SYSTEM

FIELD

The present application generally relates to vehicle evaporative emissions (EVAP) systems and, more particularly, to gasoline vapor extraction and storage within a vehicle fuel tank system.

BACKGROUND

An evaporative emissions (EVAP) system of a vehicle captures and stores fuel vapor that evaporates from liquid fuel (e.g., gasoline) housed in a fuel tank. Because it is highly combustible, the use of this fuel vapor for engine combustion has various benefits. One example use of fuel vapor is to decrease hydrocarbon (HC) emissions during engine cold starts. The amount of available fuel vapor, however, is limited by the rate at which it evaporates from the liquid fuel and is then stored in a vapor canister. Accordingly, while conventional EVAP systems do work well for their intended purpose, there remains a need for improvement in the relevant art.

SUMMARY

According to one example aspect of the invention, an evaporative emissions (EVAP) system for a vehicle is presented. In one exemplary implementation, the system comprises: an auxiliary vapor canister that is distinct from a primary vapor canister of the EVAP system and that is configured to store fuel vapor evaporated from a liquid fuel housed in a fuel tank of the vehicle, a three-way valve disposed between the primary vapor canister, the auxiliary vapor canister, and the fuel tank, and a controller configured to: command the three-way valve to a first position that fluidly connects the auxiliary vapor canister and a bottom portion of the fuel tank, control at least one of an engine of the vehicle and a purge pump of the EVAP system disposed between the engine and the primary and auxiliary vapor canisters to create a vacuum condition in the fuel tank that draws fuel vapor therefrom and into the auxiliary vapor canister for storage, command the three-way valve to a second position that fluidly connects the bottom portion of the fuel tank to an atmosphere outside of the EVAP system thereby generating additional fuel vapor in the fuel tank and returning the fuel tank to an atmospheric condition, command the three-way valve to a third position that fluidly connects the auxiliary vapor canister to the atmosphere, and control at least one of the engine and the purge pump to draw the fuel vapor from the auxiliary vapor canister into the engine.

In some implementations, the controller is configured to command the three-way valve to the third position and control at least one of the engine and the purge pump to draw the fuel vapor from the auxiliary vapor canister into the engine during a cold start of the engine to decrease emissions.

In some implementations, the controller is configured to command the three-way valve to the second position to draw air from the atmosphere into the bottom portion of the fuel tank to cause bubbling in the liquid fuel and the generation of the additional fuel vapor. In some implementations, the primary vapor canister has an associated plenum heater configured to heat the air drawn from the atmosphere and into the bottom portion of the fuel tank when the three-way valve is in the second position to further improve the generation of the additional fuel vapor.

In some implementations, the controller is further configured to command the three-way valve to a fourth position that fluidly connects the bottom portion of the fuel tank to both the auxiliary vapor canister and the primary vapor canister during a refueling event of the vehicle.

In some implementations, the system further comprises: a fuel tank passage fluidly connecting the fuel tank to the three-way valve, an auxiliary vapor canister input passage fluidly connecting the auxiliary vapor canister to the three-way valve, an auxiliary vapor canister output passage fluidly connecting the auxiliary vapor canister to the engine or the purge pump, a primary vapor canister input passage fluidly connecting the primary vapor canister to the atmosphere, a primary vapor canister output passage fluidly connecting the primary vapor canister to the auxiliary vapor canister output passage, and an atmospheric passage fluidly connecting the primary vapor canister input passage to the three-way valve.

In some implementations, the system further comprises: a first gate valve disposed along the primary vapor canister output passage and configured to allow or prevent flow (i) from the primary vapor canister to the engine or the fuel pump and (ii) from the auxiliary vapor canister to the engine or the fuel pump, and a second gate valve disposed along the atmospheric passage and configured to allow or prevent flow (i) from the atmosphere to the three-way valve and (ii) from the three-way valve to the primary vapor canister, wherein the controller is further configured to command the first and second gate valves.

In some implementations, during an auxiliary vapor canister purge mode, the controller is configured to: command the first gate valve to a first position preventing flow from the primary vapor canister to the engine or the purge pump via the primary vapor canister output passage, command the second gate valve to a first position allowing flow from the atmosphere to the three-way valve via the atmospheric passage, and command the three-way control valve to the third position fluidly connecting the auxiliary vapor canister to the atmosphere, wherein air is drawn through the auxiliary vapor canister to purge stored fuel vapor therefrom.

In some implementations, during a primary vapor canister purge mode, the controller is configured to: command the first gate valve to a second position allowing flow from the primary vapor canister to the engine or the purge pump, command the second gate valve to a second position preventing flow from the atmosphere to the three-way valve, and command the three-way control valve to a fourth position preventing any flow therethrough, wherein air is drawn through the primary vapor canister to purge stored fuel vapor therefrom.

In some implementations, during a refueling mode, the controller is configured to: command the first gate valve to the second position, command the second gate valve to the second position, and command the three-way control valve to a fifth position that fluidly connects the fuel tank passage, the auxiliary vapor canister input passage, and the atmospheric passage, wherein fuel vapor flows from the fuel tank to both the auxiliary and primary vapor canisters.

According to another example aspect of the invention, a method of controlling an EVAP system of a vehicle is presented. In one exemplary implementation, the method comprises: commanding, by a controller of the vehicle, a three-way valve of the EVAP system to a first position that fluidly connects an auxiliary vapor canister of the EVAP system and a bottom portion of a fuel tank of the vehicle, wherein the auxiliary vapor canister is distinct from a primary vapor canister of the EVAP system and is configured to store fuel vapor evaporated from a liquid fuel housed in the fuel tank, and wherein the three-way valve is disposed between the primary vapor canister, the auxiliary vapor canister, and the fuel tank, controlling, by the controller, at least one of an engine of the vehicle and a purge pump of the EVAP system disposed between the engine and the primary and auxiliary vapor canisters to create a vacuum condition in the fuel tank that draws fuel vapor therefrom and into the auxiliary vapor canister for storage, commanding, by the controller, the three-way valve to a second position that fluidly connects the bottom portion of the fuel tank to an atmosphere outside of the EVAP system thereby generating additional fuel vapor in the fuel tank and returning the fuel tank to an atmospheric condition, commanding, by the controller, the three-way valve to a third position that fluidly connects the auxiliary vapor canister to the atmosphere, and controlling, by the controller, at least one of the engine and the purge pump to draw the fuel vapor from the auxiliary vapor canister into the engine.

In some implementations, commanding the three-way valve to the third position and controlling at least one of the engine and the purge pump to draw the fuel vapor from the auxiliary vapor canister into the engine is performed during a cold start of the engine to decrease emissions.

In some implementations, commanding the three-way valve to the second position to draw air from the atmosphere into the bottom portion of the fuel tank causes bubbling in the liquid fuel and the generation of the additional fuel vapor. In some implementations, the primary vapor canister has an associated plenum heater configured to heat the air drawn from the atmosphere and into the bottom portion of the fuel tank when the three-way valve is in the second position to further improve the generation of the additional fuel vapor.

In some implementations, the method further comprises commanding, by the controller, the three-way valve to a fourth position that fluidly connects the bottom portion of the fuel tank to both the auxiliary vapor canister and the primary vapor canister during a refueling event of the vehicle.

In some implementations, the EVAP system further comprises: a fuel tank passage fluidly connecting the fuel tank to the three-way valve, an auxiliary vapor canister input passage fluidly connecting the auxiliary vapor canister to the three-way valve, an auxiliary vapor canister output passage fluidly connecting the auxiliary vapor canister to the engine or the purge pump, a primary vapor canister input passage fluidly connecting the primary vapor canister to the atmosphere, a primary vapor canister output passage fluidly connecting the primary vapor canister to the auxiliary vapor canister output passage, and an atmospheric passage fluidly connecting the primary vapor canister input passage to the three-way valve.

In some implementations, the method further comprises: controlling, by the controller, a first gate valve of the EVAP system disposed along the primary vapor canister output passage to allow or prevent flow (i) from the primary vapor canister to the engine or the fuel pump and (ii) from the auxiliary vapor canister to the engine or the fuel pump, and controlling, by the controller, a second gate valve of the EVAP system disposed along the atmospheric passage to allow or prevent flow (i) from the atmosphere to the three-way valve and (ii) from the three-way valve to the primary vapor canister.

In some implementations, the method further comprises during an auxiliary vapor canister purge mode: commanding, by the controller, the first gate valve to a first position preventing flow from the primary vapor canister to the engine or the purge pump via the primary vapor canister output passage, commanding, by the controller, the second gate valve to a first position allowing flow from the atmosphere to the three-way valve via the atmospheric passage, and commanding, by the controller, the three-way control valve to the third position fluidly connecting the auxiliary vapor canister to the atmosphere, wherein air is drawn through the auxiliary vapor canister to purge stored fuel vapor therefrom.

In some implementations, the method further comprises during a primary vapor canister purge mode: commanding, by the controller, the first gate valve to a second position allowing flow from the primary vapor canister to the engine or the purge pump, commanding, by the controller, the second gate valve to a second position preventing flow from the atmosphere to the three-way valve, and commanding, by the controller, the three-way control valve to a fourth position preventing any flow therethrough, wherein air is drawn through the primary vapor canister to purge stored fuel vapor therefrom.

In some implementations, the method further comprises during a refueling mode: commanding, by the controller, the first gate valve to the second position, commanding, by the controller, the second gate valve to the second position, and commanding, by the controller, the three-way control valve to a fifth position that fluidly connects the fuel tank passage, the auxiliary vapor canister input passage, and the atmospheric passage, wherein fuel vapor flows from the fuel tank to both the auxiliary and primary vapor canisters.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, there remains a need for an evaporative emissions (EVAP) system that is able to provide fuel vapor for all desired uses. For example, fuel vapor may be necessary during every engine cold start to meet emissions regulations. Accordingly, an improved EVAP system and its method of operation are presented. The EVAP system comprises an auxiliary vapor canister in addition to a traditional primary vapor canister. Fluid flow through the EVAP system is controlled via a three-way valve and a pair of gate valves. Initially, the auxiliary vapor canister is charged by creating a vacuum condition in the fuel tank (via an engine or a purge pump) to draw fuel vapor into the auxiliary vapor canister. After charging, air is drawn from an atmosphere outside the EVAP system into a bottom portion of the fuel tank, which causes bubbling and the generation of additional fuel vapor therein. This air is optionally heated by a plenum heater associated with the primary vapor canister to further improve fuel vapor generation. During certain conditions, such as engine cold starts, the auxiliary vapor canister is utilized to provide fuel vapor to the engine. During other conditions, such as normal engine operation, the primary vapor canister is utilized to provide fuel vapor to the engine. During refuel events, fuel vapor is allowed to charge both the auxiliary and primary vapor canisters.

Figure 1:
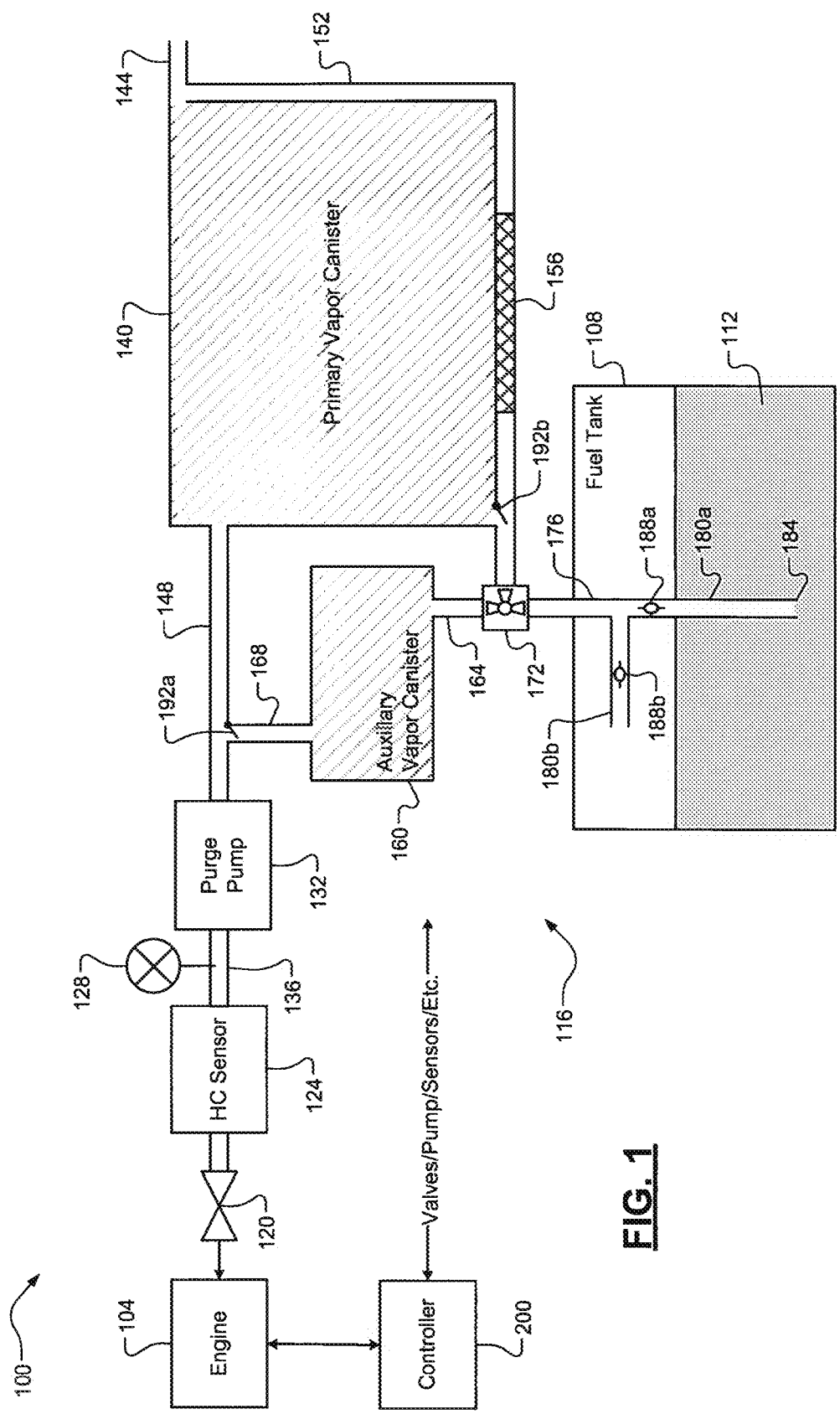
FIG. 1 is a diagram of an example vehicle having an evaporative emissions (EVAP) system according to the principles of the present disclosure.

Referring now to FIG. 1, a diagram of an example vehicle 100 is illustrated. The vehicle 100 comprises an engine 104 that combusts a mixture of air and liquid fuel 112 (e.g., gasoline) housed by a fuel tank 108. The vehicle 100 comprises an EVAP system 116 according to the principles of the present disclosure. The EVAP system 116 comprises a purge valve 120, a hydrocarbon (HC) sensor 124, a pressure sensor 128, and a purge pump 132 all disposed along a purge line or passage 136. It will be appreciated that some of these components could be optional, such as the pressure sensor 128 and the purge pump 132. For example, when the EVAP system 116 does not comprise the purge pump 132, engine vacuum could be utilized to draw fuel vapor through the EVAP system 116. In certain conditions, such as engine cold starts, however, there is no engine vacuum and thus the purge pump 132 is capable of providing fuel vapor during these conditions.

The EVAP system 116 further comprises a primary vapor canister 140 having an input passage 144 fluidly connected to an atmosphere outside of the EVAP system 116 and an output passage 148 that merges with the purge passage 136. An atmospheric passage 152 is also fluidly connected to the atmosphere (e.g., at a same point as input passage 144) and optionally routes through an optional plenum heater 156. The EVAP system 116 further comprises an auxiliary vapor canister 160 having an input passage 164 and an output passage 168 that merges with the purge passage 136 and output passage 148. Input passage 164 and atmospheric passage 152 are also connected to a three-way valve 172. Also connected to the three-way valve is a fuel tank passage 176. In some implementations, the fuel tank passage 176 splits into a first portion 180a that extends to a bottom portion 184 of the fuel tank 108 (e.g., always low enough to be submerged by the liquid fuel 112) and a second portion 180b towards a top portion of the fuel tank 108 (e.g., always high enough to not be submerged by the liquid fuel 112). These portions 180a, 180b could have respective check valves 188a, 188b to allow only one-way flow.

The EVAP system 116 further comprises a pair of gate valves 192a, 192b. The first gate valve 192a is configured to fluidly connect one of output passages 148 and 168 to the purge passage 136. The second gate valve 192b is configured to fluidly the primary vapor canister 140 or the atmospheric passage 152 to the three-way valve 172. A controller 200 controls operation of the vehicle 100, such as controlling air/fuel/spark of the engine 104. The controller 200 also communicates with the various sensors illustrated and described herein (HC sensor 124, pressure sensor 128, etc.) and commands the various valves and other devices illustrated and described herein (purge valve 120, purge pump 132, three-way valve 172, gate valves 192a and 192b, etc.). While the gate valves 192a, 192b only have two possible positions, the three-way valve 172 has five possible positions (e.g., all paths closed, all paths open, path A-B open and path C closed, path A-C open and path B closed, and path B-C open and path A closed). The specific stages of operation of the EVAP system 116 will now be described in greater detail.

Figure 2A:
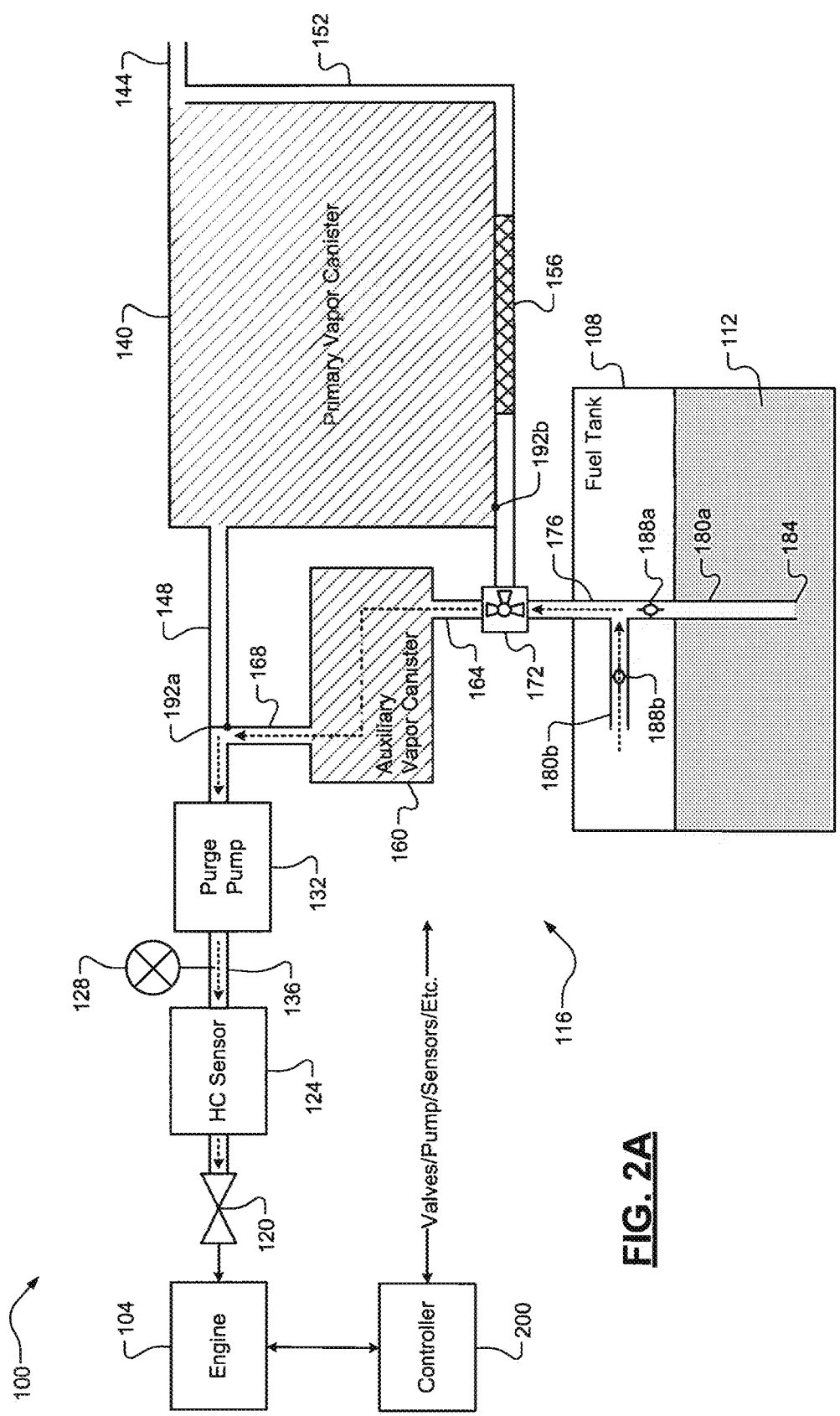
FIGS. 2A-2E are diagrams illustrating various stages of fluid flow through the EVAP system according to the principles of the present disclosure.
Figure 2B:
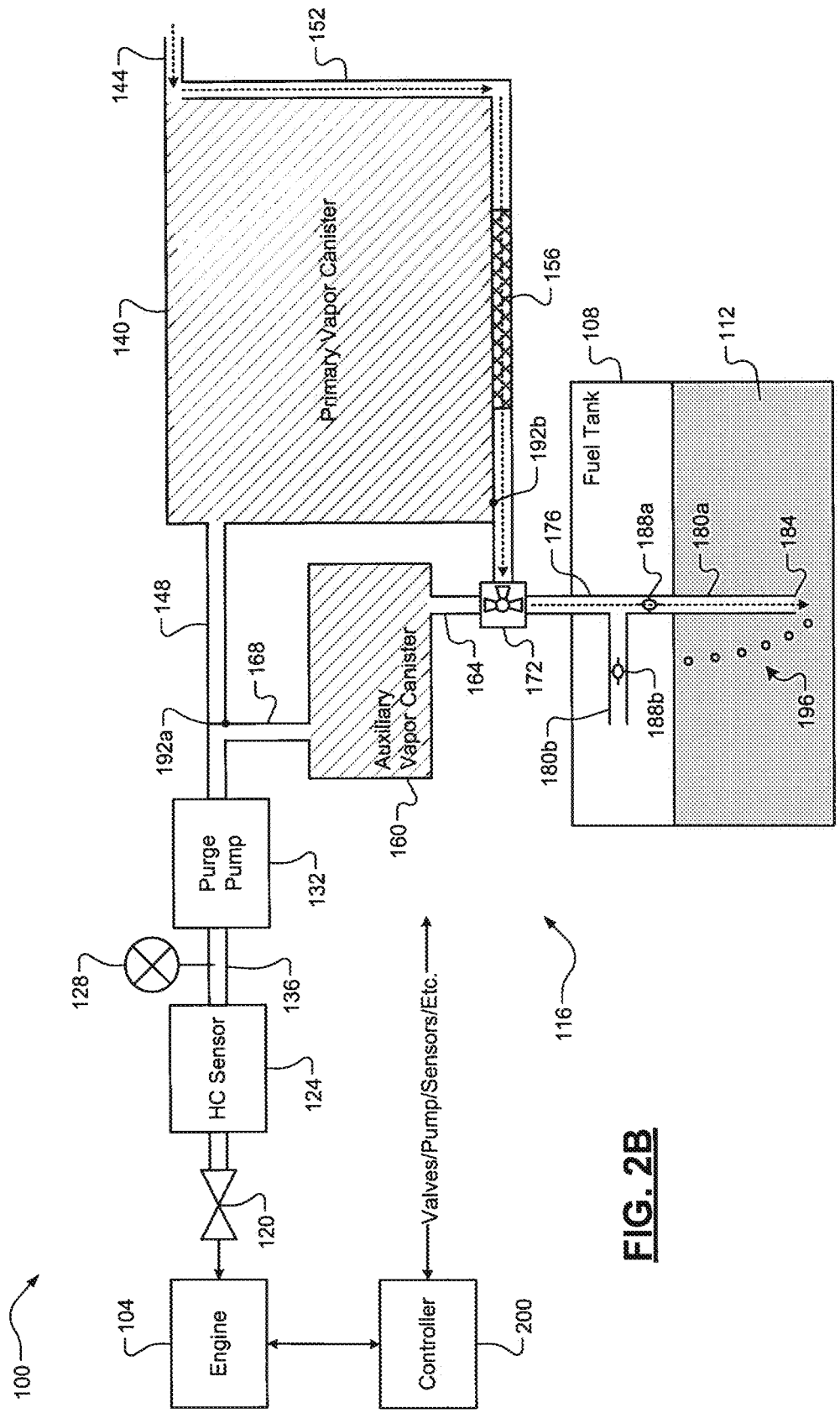

Referring now to FIGS. 2A-2E, fluid flow through the EVAP system 116 is illustrates at various stages of operation. In FIG. 2A, charging of the auxiliary vapor canister 160 is being performed. As shown, gate valve 192a is preventing flow through passage 148. The three-way valve 172 is commanded to a first position to allow fuel vapor to flow from the fuel tank 108 through fuel tank passages 180b and 176 and input passage 164 and into the auxiliary vapor canister 160 where it is absorbed and stored. This occurs because the engine 104 and/or the purge pump 132 are controlled to create a vacuum condition in the fuel tank 108 that causes the fuel vapor to flow out of the fuel tank 108. During or after charging, the fuel vapor will continue to flow to the engine 104 through output passage 168 and purge passage 136. In FIG. 2B, the three-way valve 172 is commanded to a second position to allow air to flow from the atmosphere through input passage 144, the atmospheric passage 152, and fuel tank passages 176 and 180a. This air causes bubbling 196 in the liquid fuel 112, which generates additional fuel vapor that then resides in the top portion of the fuel tank 108. This could also be described as recharging the fuel tank fuel vapor, which could then be used to recharge the auxiliary vapor canister 160.

Figure 2C:
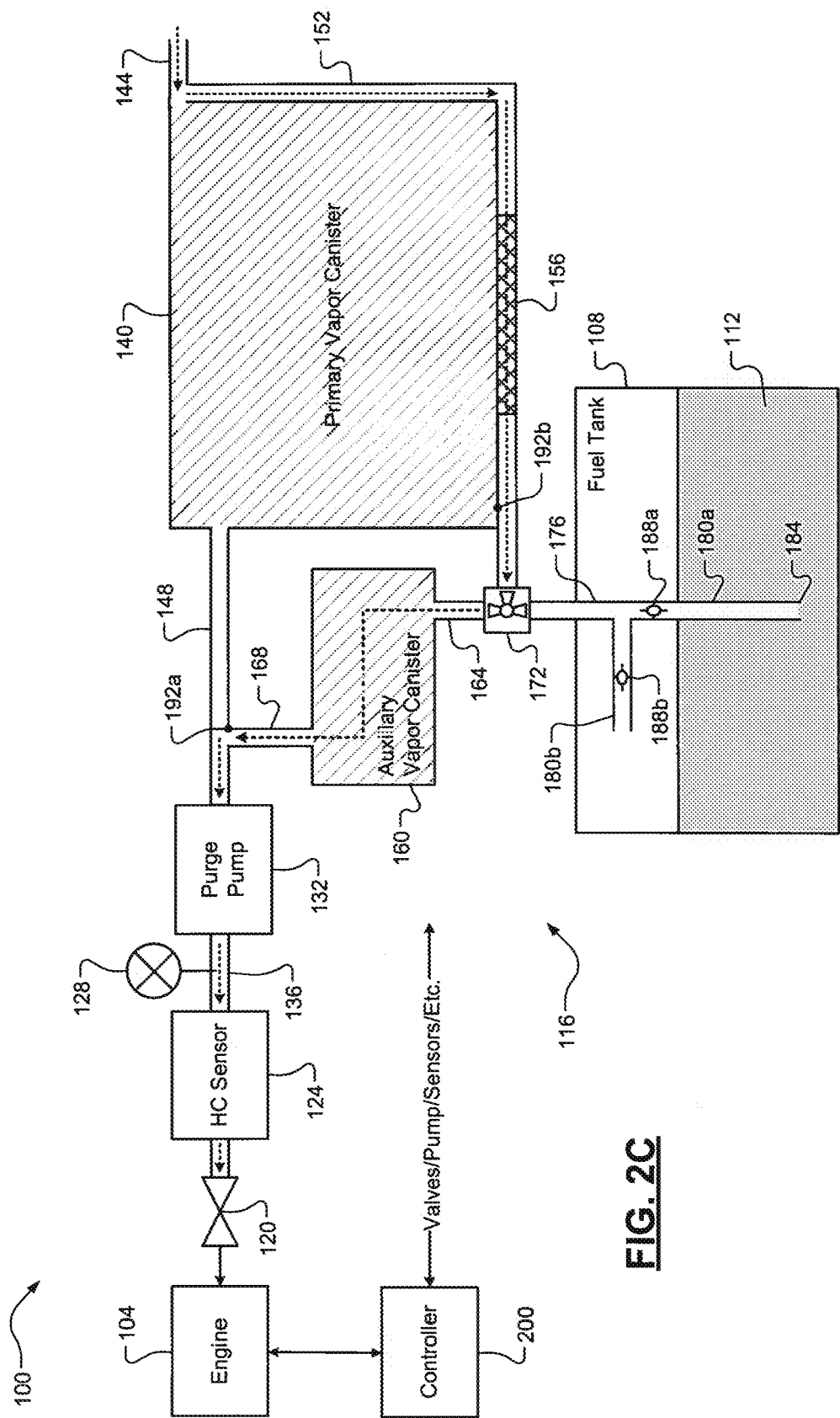
Figure 2D:
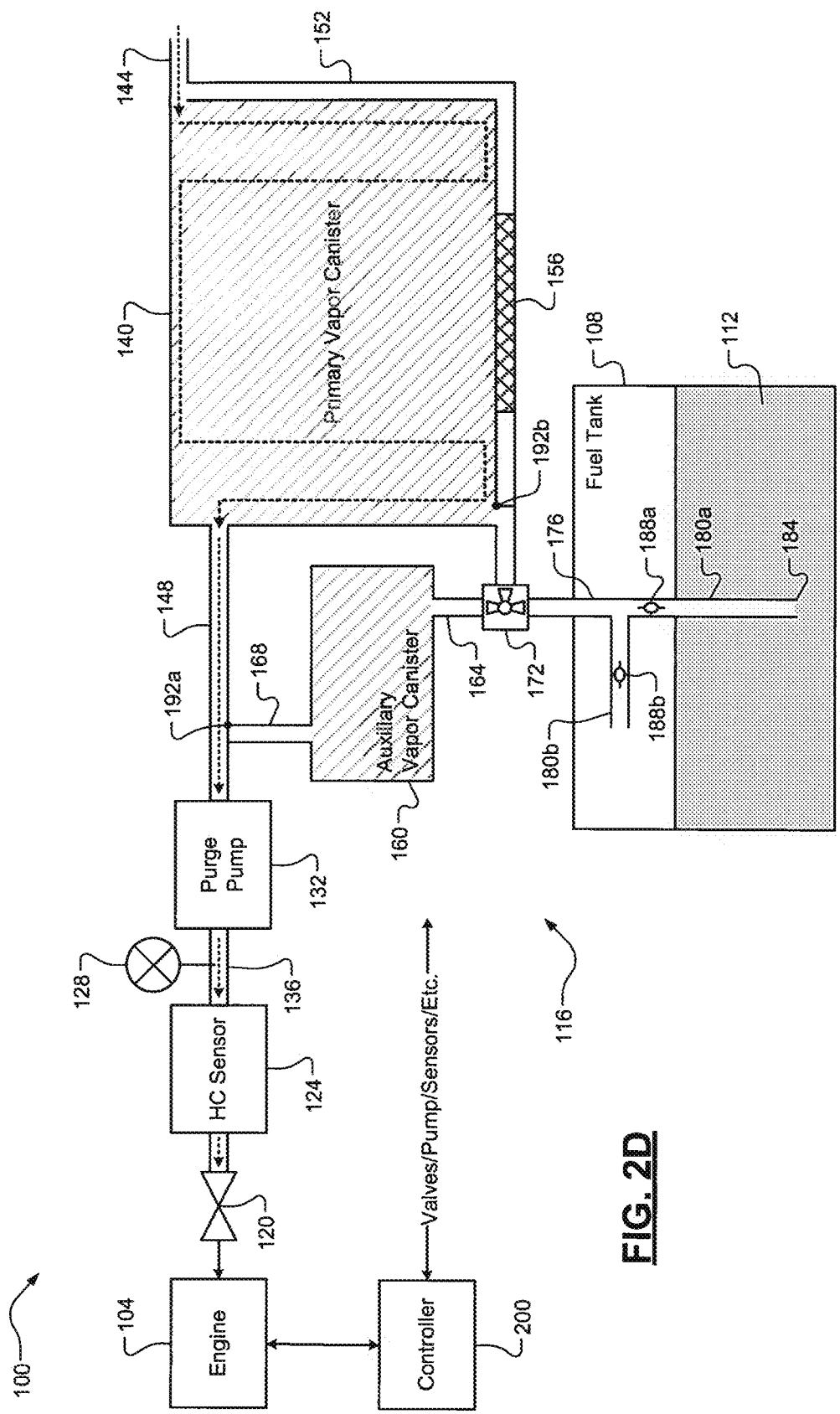
Figure 2E:
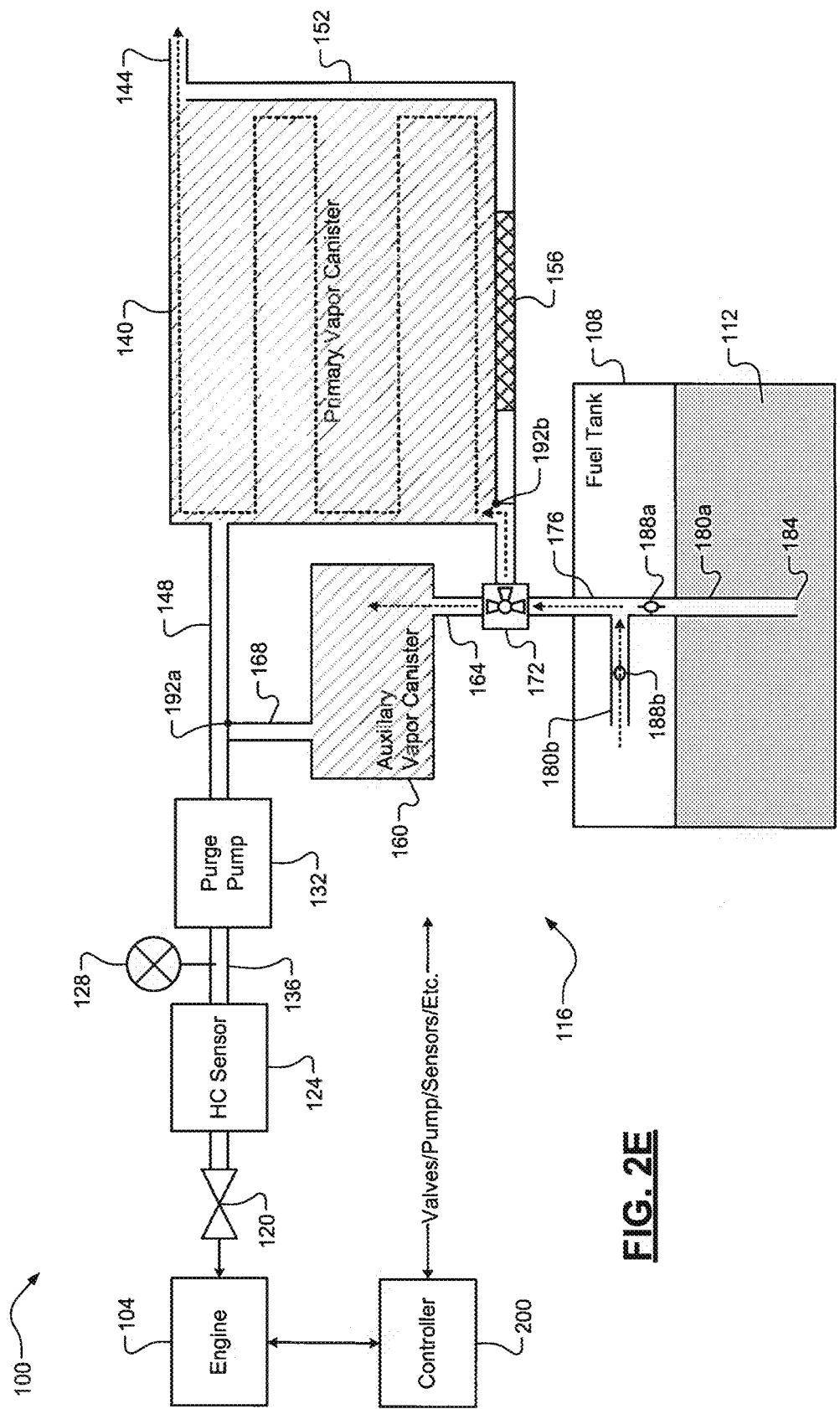

In FIG. 2C, an auxiliary vapor canister purge mode is illustrated. The three-way valve 172 is commanded to a third position to allow air to flow from the atmosphere through input passage 144, atmospheric passage 152, the auxiliary vapor canister 160 and its input and output passages 164, 168, and finally to the purge passage 136. This auxiliary vapor canister purge mode could be utilized for certain operating conditions (e.g., "auxiliary operation") where fuel vapor is necessary, such as engine cold starts or any starts of the engine 104. In FIG. 2D, a primary vapor canister purge mode is illustrated. Gate valves 192a and 192b are each repositioned to prevent flow through the atmospheric passage 152 and output passage 168. It will be appreciated that the three-way valve 172 could also be commanded to a fourth position (all three paths closed) to prevent any flow therethrough. In this configuration, air flows from the atmosphere through the primary vapor canister 140 and its input and output passages 144, 148 and finally to the purge passage 136. This primary vapor canister purge mode could be utilized for all other operating conditions, such as normal operation of the engine 104. Lastly, in FIG. 2E, a refuel mode for an engine-off refueling event of the vehicle 100 is illustrated. The three-way valve 172 is commanded to a fifth position (all three paths open) to allow fuel vapor to recharge both the primary and auxiliary vapor canisters 140 and 160 during the refueling.

Figure 3:
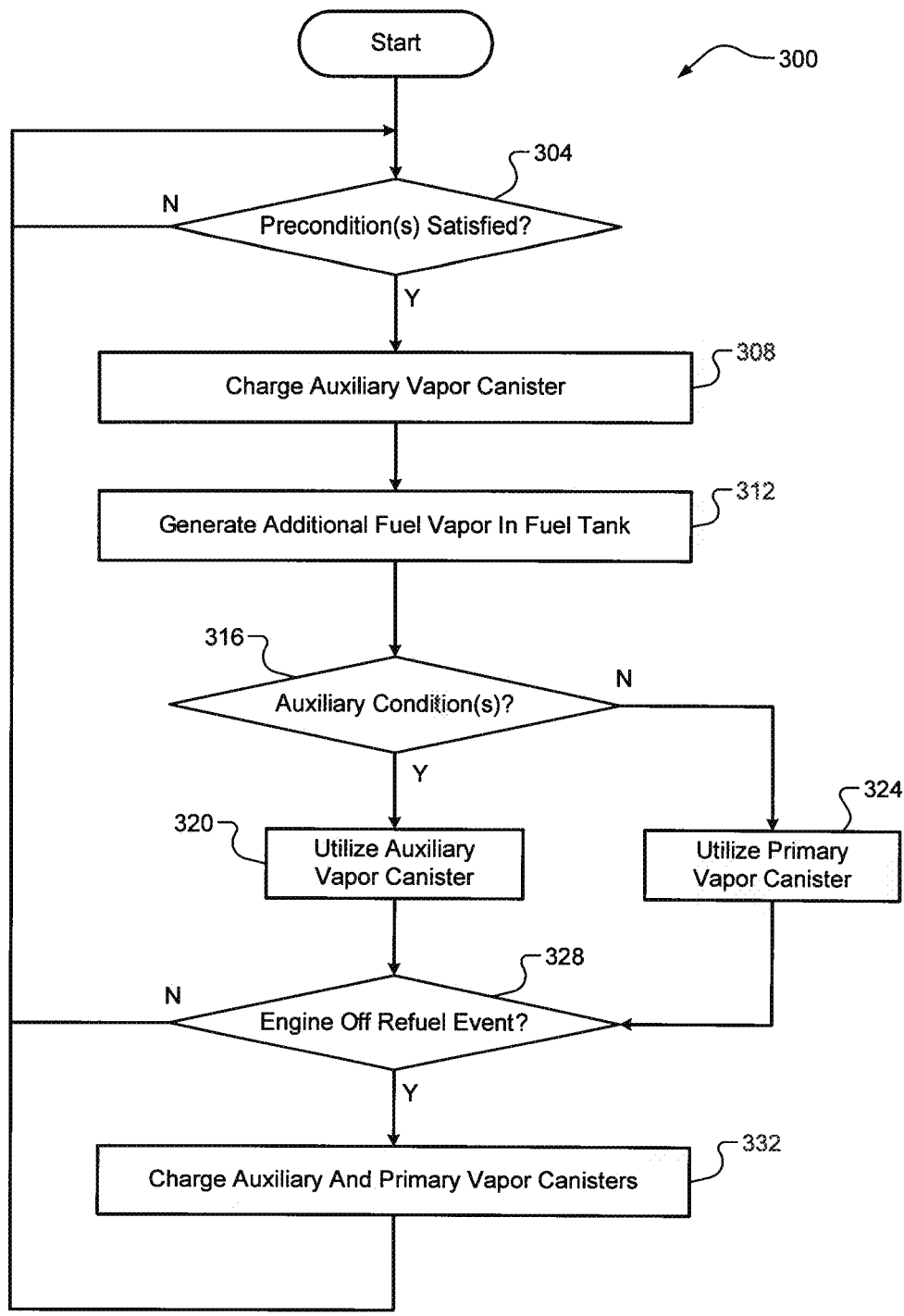
FIG. 3 is a flow diagram of an example method of controlling the EVAP system according to the principles of the present disclosure.

Referring now to FIG. 3, a flow diagram of an example method 300 of operating the EVAP system 116 is illustrated. At 304, the controller 200 determines whether a set of one or more preconditions is satisfied. This could include, for example, the engine 104 being on. When the set of preconditions is satisfied, the method 300 proceeds to 308. Otherwise, the method 300 ends or returns to 304. At 308, the controller 200 charges the auxiliary vapor canister 160 as described above and as illustrated in FIG. 2A. At 312, the controller 200 generates additional fuel vapor in the fuel tank as described above and as illustrated in FIG. 2B. At 316, the controller 160 determines whether auxiliary conditions are present. As previously described, this could include an imminent engine cold start. When present, the method 300 proceeds to 320 where the auxiliary vapor canister purge mode is enabled as described above and as illustrated in FIG. 2C. Otherwise, the method 300 proceeds to 324 where the primary vapor canister purge mode is enabled as described above and as illustrated in FIG. 2D. At 328, the controller 200 determines whether an engine-off refuel event is occurring. When true, the method 300 proceeds to 332 where the refuel mode is enabled as described above and as illustrated in FIG. 2E. Otherwise, the method 300 ends or returns to 304.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An evaporative emissions (EVAP) system for a vehicle, the system comprising:
    an auxiliary vapor canister that is distinct from a primary vapor canister of the EVAP system and that is configured to store fuel vapor evaporated from a liquid fuel housed in a fuel tank of the vehicle;
    a three-way valve disposed between the primary vapor canister, the auxiliary vapor canister, and the fuel tank; and
    a controller configured to:
        command the three-way valve to a first position that fluidly connects the auxiliary vapor canister and a bottom portion of the fuel tank;
        control at least one of an engine of the vehicle and a purge pump of the EVAP system disposed between the engine and the primary and auxiliary vapor canisters to create a vacuum condition in the fuel tank that draws fuel vapor therefrom and into the auxiliary vapor canister for storage;
        command the three-way valve to a second position that fluidly connects the bottom portion of the fuel tank to an atmosphere outside of the EVAP system thereby generating additional fuel vapor in the fuel tank and returning the fuel tank to an atmospheric condition;
        command the three-way valve to a third position that fluidly connects the auxiliary vapor canister to the atmosphere; and
        control at least one of the engine and the purge pump to draw the fuel vapor from the auxiliary vapor canister into the engine.

2. The system of claim 1, wherein the controller is configured to command the three-way valve to the third position and control at least one of the engine and the purge pump to draw the fuel vapor from the auxiliary vapor canister into the engine during a cold start of the engine to decrease emissions.

3. The system of claim 1, wherein the controller is configured to command the three-way valve to the second position to draw air from the atmosphere into the bottom portion of the fuel tank to cause bubbling in the liquid fuel and the generation of the additional fuel vapor.

4. The system of claim 3, wherein the primary vapor canister has an associated plenum heater configured to heat the air drawn from the atmosphere and into the bottom portion of the fuel tank when the three-way valve is in the second position to further improve the generation of the additional fuel vapor.

5. The system of claim 1, wherein the controller is further configured to command the three-way valve to a fourth position that fluidly connects the bottom portion of the fuel tank to both the auxiliary vapor canister and the primary vapor canister during a refueling event of the vehicle.

6. The system of claim 1, further comprising:
    a fuel tank passage fluidly connecting the fuel tank to the three-way valve;
    an auxiliary vapor canister input passage fluidly connecting the auxiliary vapor canister to the three-way valve;
    an auxiliary vapor canister output passage fluidly connecting the auxiliary vapor canister to the engine or the purge pump;
    a primary vapor canister input passage fluidly connecting the primary vapor canister to the atmosphere;
    a primary vapor canister output passage fluidly connecting the primary vapor canister to the auxiliary vapor canister output passage; and
    an atmospheric passage fluidly connecting the primary vapor canister input passage to the three-way valve.

7. The system of claim 6, further comprising:
    a first gate valve disposed along the primary vapor canister output passage and configured to allow or prevent flow (i) from the primary vapor canister to the engine or the fuel pump and (ii) from the auxiliary vapor canister to the engine or the fuel pump; and
    a second gate valve disposed along the atmospheric passage and configured to allow or prevent flow (i) from the atmosphere to the three-way valve and (ii) from the three-way valve to the primary vapor canister,
    wherein the controller is further configured to command the first and second gate valves.

8. The system of claim 7, wherein during an auxiliary vapor canister purge mode, the controller is configured to:
    command the first gate valve to a first position preventing flow from the primary vapor canister to the engine or the purge pump via the primary vapor canister output passage;
    command the second gate valve to a first position allowing flow from the atmosphere to the three-way valve via the atmospheric passage; and
    command the three-way control valve to the third position fluidly connecting the auxiliary vapor canister to the atmosphere,
    wherein air is drawn through the auxiliary vapor canister to purge stored fuel vapor therefrom.

9. The system of claim 8, wherein during a primary vapor canister purge mode, the controller is configured to:

command the first gate valve to a second position allowing flow from the primary vapor canister to the engine or the purge pump;
command the second gate valve to a second position preventing flow from the atmosphere to the three-way valve; and
command the three-way control valve to a fourth position preventing any flow therethrough,
wherein air is drawn through the primary vapor canister to purge stored fuel vapor therefrom.

10. The system of claim 9, wherein during a refueling mode, the controller is configured to:
command the first gate valve to the second position;
command the second gate valve to the second position; and
command the three-way control valve to a fifth position that fluidly connects the fuel tank passage, the auxiliary vapor canister input passage, and the atmospheric passage,
wherein fuel vapor flows from the fuel tank to both the auxiliary and primary vapor canisters.

11. A method of controlling an evaporative emissions (EVAP) system of a vehicle, the method comprising:
commanding, by a controller of the vehicle, a three-way valve of the EVAP system to a first position that fluidly connects an auxiliary vapor canister of the EVAP system and a bottom portion of a fuel tank of the vehicle, wherein the auxiliary vapor canister is distinct from a primary vapor canister of the EVAP system and is configured to store fuel vapor evaporated from a liquid fuel housed in the fuel tank, and wherein the three-way valve is disposed between the primary vapor canister, the auxiliary vapor canister, and the fuel tank;
controlling, by the controller, at least one of an engine of the vehicle and a purge pump of the EVAP system disposed between the engine and the primary and auxiliary vapor canisters to create a vacuum condition in the fuel tank that draws fuel vapor therefrom and into the auxiliary vapor canister for storage;
commanding, by the controller, the three-way valve to a second position that fluidly connects the bottom portion of the fuel tank to an atmosphere outside of the EVAP system thereby generating additional fuel vapor in the fuel tank and returning the fuel tank to an atmospheric condition;
commanding, by the controller, the three-way valve to a third position that fluidly connects the auxiliary vapor canister to the atmosphere; and
controlling, by the controller, at least one of the engine and the purge pump to draw the fuel vapor from the auxiliary vapor canister into the engine.

12. The method of claim 11, wherein commanding the three-way valve to the third position and controlling at least one of the engine and the purge pump to draw the fuel vapor from the auxiliary vapor canister into the engine is performed during a cold start of the engine to decrease emissions.

13. The method of claim 11, wherein commanding the three-way valve to the second position to draw air from the atmosphere into the bottom portion of the fuel tank causes bubbling in the liquid fuel and the generation of the additional fuel vapor.

14. The method of claim 13, wherein the primary vapor canister has an associated plenum heater configured to heat the air drawn from the atmosphere and into the bottom portion of the fuel tank when the three-way valve is in the second position to further improve the generation of the additional fuel vapor.

15. The method of claim 11, further comprising commanding, by the controller, the three-way valve to a fourth position that fluidly connects the bottom portion of the fuel tank to both the auxiliary vapor canister and the primary vapor canister during a refueling event of the vehicle.

16. The method of claim 11, wherein the EVAP system further comprises:
a fuel tank passage fluidly connecting the fuel tank to the three-way valve;
an auxiliary vapor canister input passage fluidly connecting the auxiliary vapor canister to the three-way valve;
an auxiliary vapor canister output passage fluidly connecting the auxiliary vapor canister to the engine or the purge pump;
a primary vapor canister input passage fluidly connecting the primary vapor canister to the atmosphere;
a primary vapor canister output passage fluidly connecting the primary vapor canister to the auxiliary vapor canister output passage; and
an atmospheric passage fluidly connecting the primary vapor canister input passage to the three-way valve.

17. The method of claim 16, further comprising:
controlling, by the controller, a first gate valve of the EVAP system disposed along the primary vapor canister output passage to allow or prevent flow (i) from the primary vapor canister to the engine or the fuel pump and (ii) from the auxiliary vapor canister to the engine or the fuel pump; and
controlling, by the controller, a second gate valve of the EVAP system disposed along the atmospheric passage to allow or prevent flow (i) from the atmosphere to the three-way valve and (ii) from the three-way valve to the primary vapor canister.

18. The method of claim 17, further comprising during an auxiliary vapor canister purge mode:
commanding, by the controller, the first gate valve to a first position preventing flow from the primary vapor canister to the engine or the purge pump via the primary vapor canister output passage;
commanding, by the controller, the second gate valve to a first position allowing flow from the atmosphere to the three-way valve via the atmospheric passage; and
commanding, by the controller, the three-way control valve to the third position fluidly connecting the auxiliary vapor canister to the atmosphere,
wherein air is drawn through the auxiliary vapor canister to purge stored fuel vapor therefrom.

19. The method of claim 18, further comprising during a primary vapor canister purge mode:
commanding, by the controller, the first gate valve to a second position allowing flow from the primary vapor canister to the engine or the purge pump;
commanding, by the controller, the second gate valve to a second position preventing flow from the atmosphere to the three-way valve; and
commanding, by the controller, the three-way control valve to a fourth position preventing any flow therethrough,
wherein air is drawn through the primary vapor canister to purge stored fuel vapor therefrom.

20. The method of claim 19, further comprising during a refueling mode:
commanding, by the controller, the first gate valve to the second position;

commanding, by the controller, the second gate valve to the second position; and commanding, by the controller, the three-way control valve to a fifth position that fluidly connects the fuel tank passage, the auxiliary vapor canister input passage, and the atmospheric passage, wherein fuel vapor flows from the fuel tank to both the auxiliary and primary vapor canisters.

\* \* \* \* \*